(No Model.) 2 Sheets—Sheet 2.
J. McCONECHY.
WHEEL FOR CYCLES.
No. 572,683. Patented Dec. 8, 1896.
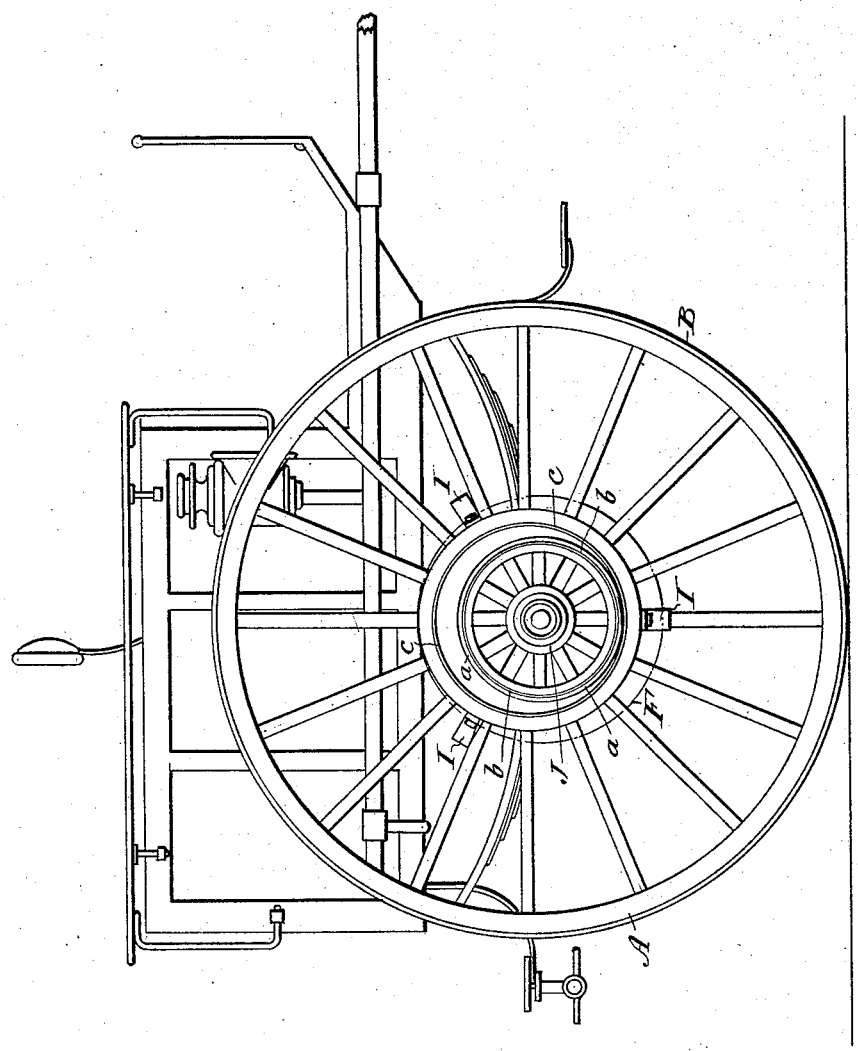
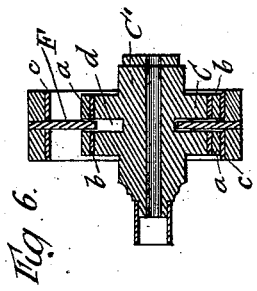
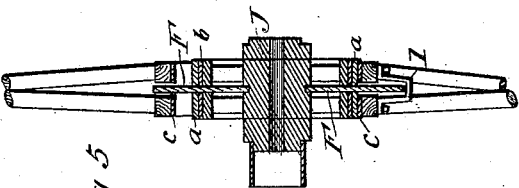
Witnesses.
W. Ellwood Allen.
Jas. W. White.
Inventor.
James McConechy.
By Knight Bros
Attorneys.

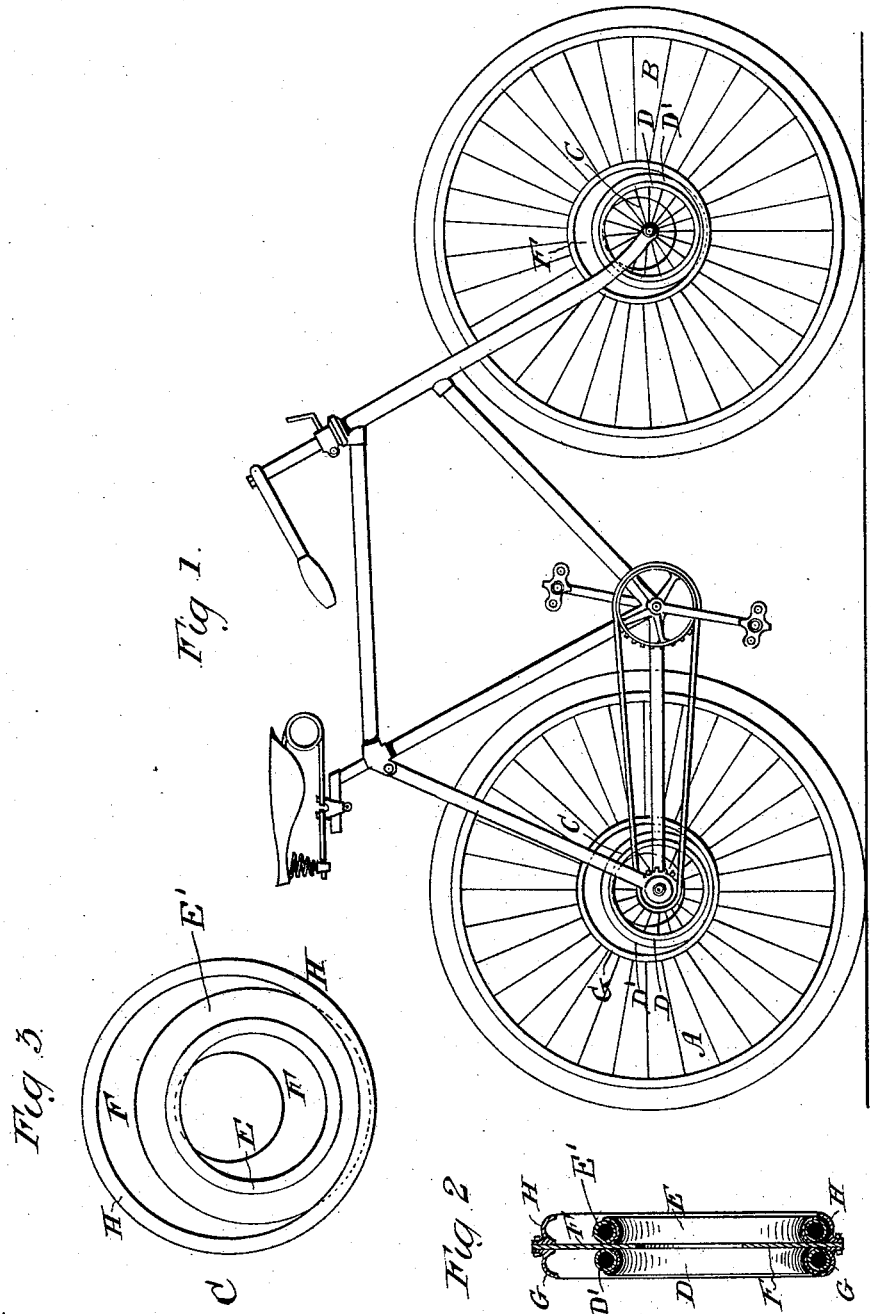

UNITED STATES PATENT OFFICE.

JAMES McCONECHY, OF GLASGOW, SCOTLAND.

WHEEL FOR CYCLES.

SPECIFICATION forming part of Letters Patent No. 572,683, dated December 8, 1896.

Application filed March 9, 1896. Serial No. 582,443. (No model.)

*To all whom it may concern:*

Be it known that I, JAMES McCONECHY, manufacturer, a subject of the Queen of Great Britain and Ireland, residing at 67 Renfield Street, in the city of Glasgow, Scotland, have invented certain Improvements in Wheels for Cycles, Buses, Cabs, and other Wheeled Vehicles, of which the following is a specification.

This invention has for its object to construct the wheels of cycles or other vehicles so that they may be the more easily propelled.

In the drawings, Figure 1 is a front elevation of a bicycle embodying my improvements. Figs. 2 and 3 are front elevation and vertical section of the eccentric wheel, drawn to an enlarged scale. Fig. 4 is a side elevation of my invention as applied to a polo-cart. Fig. 5 is a part transverse section of one of the wheels. Fig. 6 is an alternative method of eccentric wheel.

My invention as applied to a cycle consists in constructing both the driving-wheel A and front wheel B, Fig. 1, with an inner eccentric wheel C. The said wheel is composed, preferably, of two parallel fellies or rims D and E, fitted with pneumatic tires, which are divided by a disk F, of thin sheet metal. The said disk F, which to facilitate its being fitted in position may or may not be made up of sections, and immovably secured to the smaller circumference of the said larger wheels A and B, whose integral parts consist also of a pair of fellies G and H, but having their hollows inverted in order to provide suitable paths or grooves for the pneumatic tires of the eccentric wheel to roll in, as seen more particularly in Fig. 2. The said pair of fellies D and E are provided with the usual wire spokes, which connect the hub of the cycle with the eccentric wheel. Spokes also are carried from the inner circumference of the wheels A and B to their outer circumference. The axes of the inner and outer wheel do not coincide.

When the bicycle is being driven, the power required to start it is excessively small. The eccentric wheel by frictional contact carries around its larger wheel, and when speed has been got up an increment of momentum will be obtained, with the result that the cycle, it is calculated, will develop racing capabilities not hitherto attained.

Figs. 4, 5, and 6 illustrate the improvements applied to a road-vehicle, a polo-cart, for example. The eccentric wheel C, already described, is placed within the wheels A and B, respectively, on either side of the machine. In this form of eccentric wheel the disk F is secured to and revolves with the eccentric C, which is secured to the hub or nave J of the wheel by short spokes, as seen in Figs. 4 and 5. The said disk F works within the division of the smaller circumference of their respective larger wheels A and B. This division is bridged over by two, three, or more bridge-pieces I, as seen more particularly in Fig. 5. The contact-surfaces of the eccentric wheel are composed of a ring $a$ of vulcanized india-rubber, which is placed on a ring $b$ of iron. This rubber ring $a$ revolves against an iron ring $c$, fitted within the smaller circumference of the large wheels A and B aforesaid.

Fig. 5 illustrates an alternative method of constructing the eccentric C. It will be seen that the said eccentric C is formed out of the solid nave C'. The disk F in this figure is supported in the larger wheel in a manner somewhat similar to that shown in Figs. 1 and 2. A groove $d$ is formed within the hub or nave C' to guide and give free motion to the travel of the eccentric. The bearing-surfaces are the same as in Figs. 4 and 5.

Having thus described my invention, the following is what I claim as new therein and desire to secure by Letters Patent:

1. A wheel comprising a pair of parallel intermediate rims, a pair of parallel inner rims provided with a hub and located within and arranged eccentrically to the intermediate rims, and the division-plate located between the intermediate rims and also between the inner rims; substantially as described.

2. A wheel comprising a pair of parallel intermediate rims, a pair of parallel inner rims provided with a hub and located within, and arranged eccentrically to, the intermediate rims and the division-plate secured to the intermediate rims, and extending between the inner rims; substantially as described.

3. A wheel comprising a pair of parallel intermediate grooved rims providing tracks, a pair of parallel inner grooved rims provided with a hub and located within, and eccentrically to, the intermediate rims, the tires secured to the inner grooved rims and fitting in the grooves of the intermediate rims and the division-plate secured to the latter and extending between the intermediate rims and also between the inner rims; substantially as described.

In testimony whereof I have signed my name to this specification in the presence of two witnesses.

JAMES McCONECHY.

Witnesses:
JOHN LIDDLE,
ARTHUR HARTLEY GUILE.